United States Patent [19]
Shuholm et al.

[11] Patent Number: 5,905,538
[45] Date of Patent: May 18, 1999

[54] SYSTEM OF SWITCHING VIDEO OF TWO DIFFERENT STANDARDS

[75] Inventors: Kevin J. Shuholm, Grass Valley; John D. Boote, Nevada City; Iz V. Olmez, Grass Valley, all of Calif.

[73] Assignee: Tektronix, Inc., Wilsonville, Oreg.

[21] Appl. No.: 08/951,190

[22] Filed: Oct. 15, 1997

[51] Int. Cl.⁶ .................................................. H04N 5/46
[52] U.S. Cl. .......................... 348/555; 348/705; 348/558; 348/584; 348/553
[58] Field of Search .................................... 348/705, 553, 348/554, 555, 578, 579, 580, 581, 582, 583, 584, 585, 586, 587, 588, 589, 590, 591, 592, 593, 594, 595, 596, 597, 598, 599, 600, 601, 706, 558; H04N 5/46

[56] References Cited

U.S. PATENT DOCUMENTS

| | | |
|---|---|---|
| 4,743,970 | 5/1988 | Barnett ..................................... 358/183 |
| 5,420,856 | 5/1995 | Kerns ....................................... 370/58.1 |
| 5,515,110 | 5/1996 | Alig ......................................... 348/594 |
| 5,751,374 | 5/1998 | Ninomya .................................. 348/571 |

*Primary Examiner*—John K. Peng
*Assistant Examiner*—Wesner Sajous
*Attorney, Agent, or Firm*—Francis I. Gray

[57] ABSTRACT

A system for switching video of two different standards that uses a single crosspoint matrix and a single local controller coupled to two memory blocks for storage of crosspoint selection data. The crosspoint selection data is written to the crosspoint matrix according to the video reference signals that correspond to the crosspoint selection data to be written. Switching of the crosspoints then occurs according to the video reference signal corresponding to the crosspoints to be switched.

12 Claims, 8 Drawing Sheets

A=MEM1 COPIED TO MEM2. VI2 GOES LOW DURING THIS TIME.
B=MEM2 WRITES DATA TO CROSSPOINTS, REGARDLESS OF REFERENCE. SWITCH OCCURS ON RISING EDGE OF VI1.

A=MEM1 COPIED TO MEM2.
B=MEM2 WRITES DATA FOR XPTS TO SWITCH ACCORDING TO REFERENCE 1. SWITCH OCCURS ON RISING EDGE OF VI1.
C=MEM2 WRITES DATA FOR XPTS TO SWITCH ACCORDING TO REFERENCED. SWITCH OCCURS ON RISING EDGE OF VI2.

A = MEM1 COPIED TO MEM2.
B = MEM2 WRITES DATA FOR ALL XPTS, REGARDLESS OF REFERENCE. SWITCH OCCURS ON RISING EDGE OF VI1.
C = MEM2 STARTS TO WRITE DATA FOR REFERENCED SWITCHES, BUT IS STOPPED BY VI1 TRANSITION.

DATA SELECTOR

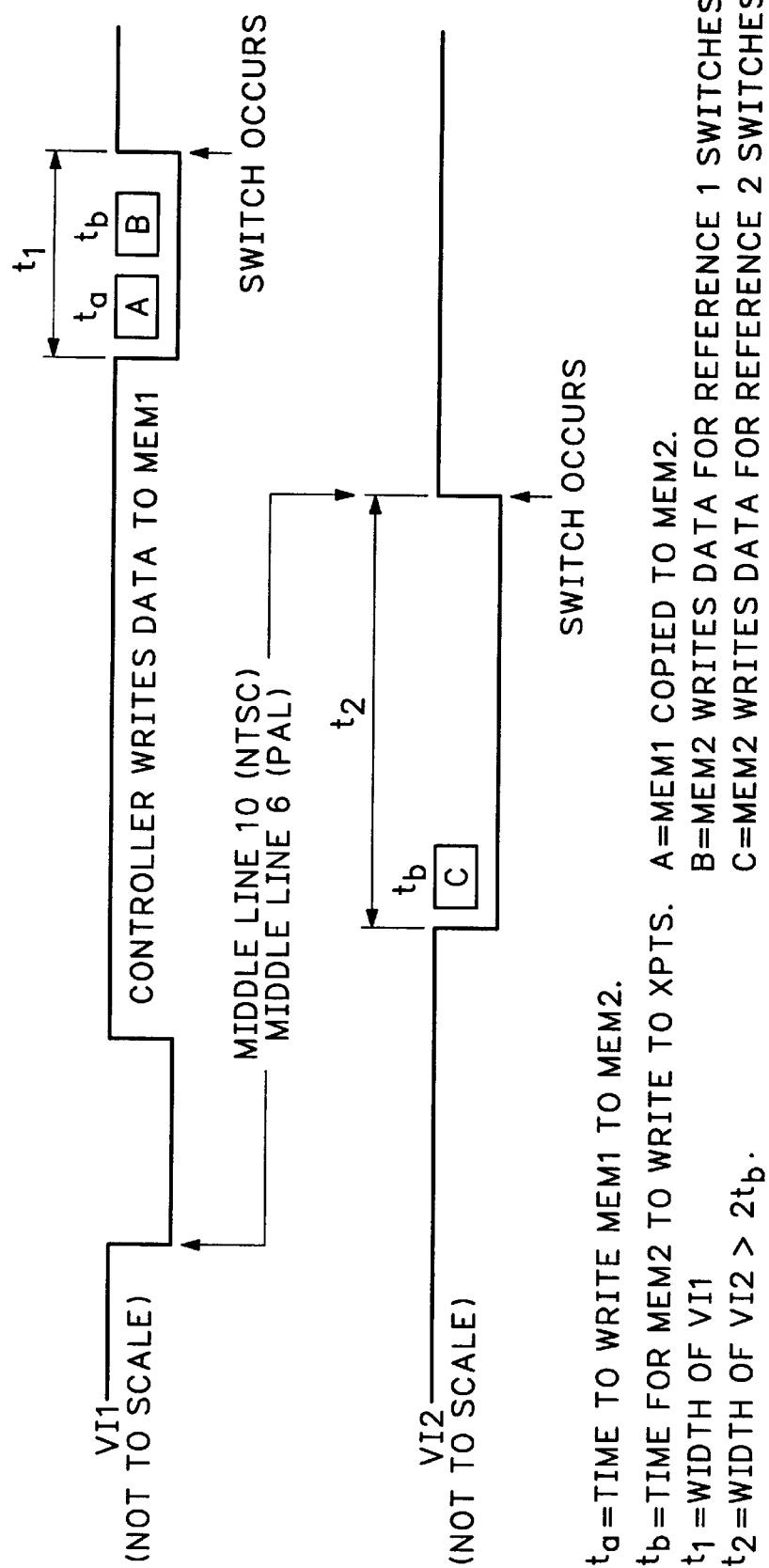

SYSTEM OF SWITCHING VIDEO OF TWO DIFFERENT STANDARDS

BACKGROUND OF THE INVENTION

The present invention relates to switching video signals, and more particularly to switching video of two different standards.

Some users of a video matrix find it desirable to be able to switch video of two different standards, i.e. the Phase Alternate Line standard (PAL), which is a 50 Hz/625 line standard, and the National Television System Committee standard (NTSC), which is a 60 Hz/525 line standard. For example, a video production house that works with international customers may be dealing with different video standards. Or, the user may wish to switch video of the same standards, but with different timings.

The problem arises in that communication from a local controller is referenced to a vertical interval strobe, say VI1, created from a single system reference, say Reference 1, by a vertical interval (VI) pulse generator. Control of the matrix by a local controller works in the following way. Reference 1 may be either the 50 Hz or 60 Hz standard, and is typically a color black signal. The pulse of VI1 typically occurs during the middle of line 10 for 60 Hz systems, or the middle of line 6 for 50 Hz systems. Communications are sent to a crosspoint switch while VI1 is not pulsing, and the final strobing, or setting of the switch takes place when the pulse occurs. If all inputs are timed to the system reference, all switches occur at the correct time. However, if the user wishes to have sources that are of a different reference than Reference 1, say Reference 2, there needs to be a way to ensure that the video switches during the correct line for sources referenced to Reference 2, even though communications still occur according to Reference 1.

There are currently two methods of dealing with this problem. The first, as shown in FIG. 1, is to simply switch signals of a second standard according to the first and allow them to glitch, but this is not acceptable. The second, as shown in FIG. 2, is to have two separate matrices, each with its own local controller, vertical interval pulse generator and reference. Often times, however, the user will have a large portion of his or her system switching one standard, while only a few sources are of the other standard. This makes it unattractive to have a separate matrix with its own local control.

What is desired is a system for switching video of two different standards that allows a single controller to still write crosspoint data at a rate according to a first reference, but allows switching to occur at the vertical interval of the first reference or a second reference of a same or different standard.

SUMMARY OF THE INVENTION

Accordingly, the present invention provides a system for switching video of two different standards that allows a single controller to still write crosspoint data at a rate according to a first reference, but allows switching to occur at the vertical interval of the first reference or a second reference. Crosspoint data is written to a block of memory and subsequently written to a second block of memory from which the crosspoint data for two video references of the same or different standards is written to a crosspoint matrix. When a vertical interval signal corresponding to the video reference for which the crosspoint matrix data was written returns high, the switch for that video reference occurs.

The objects, advantages, and other novel features of the present invention are apparent from the following detailed description when read in conjunction with the appended claims and attached drawing.

BRIEF DESCRIPTION OF THE DRAWING

FIGS. 6A, 6B, 6C, and 6D are timing diagrams of possible vertical interval pulse reference signals including conflict conditions according to the present invention.

DESCRIPTION OF THE PREFERRED EMBODIMENT

Figure 1:
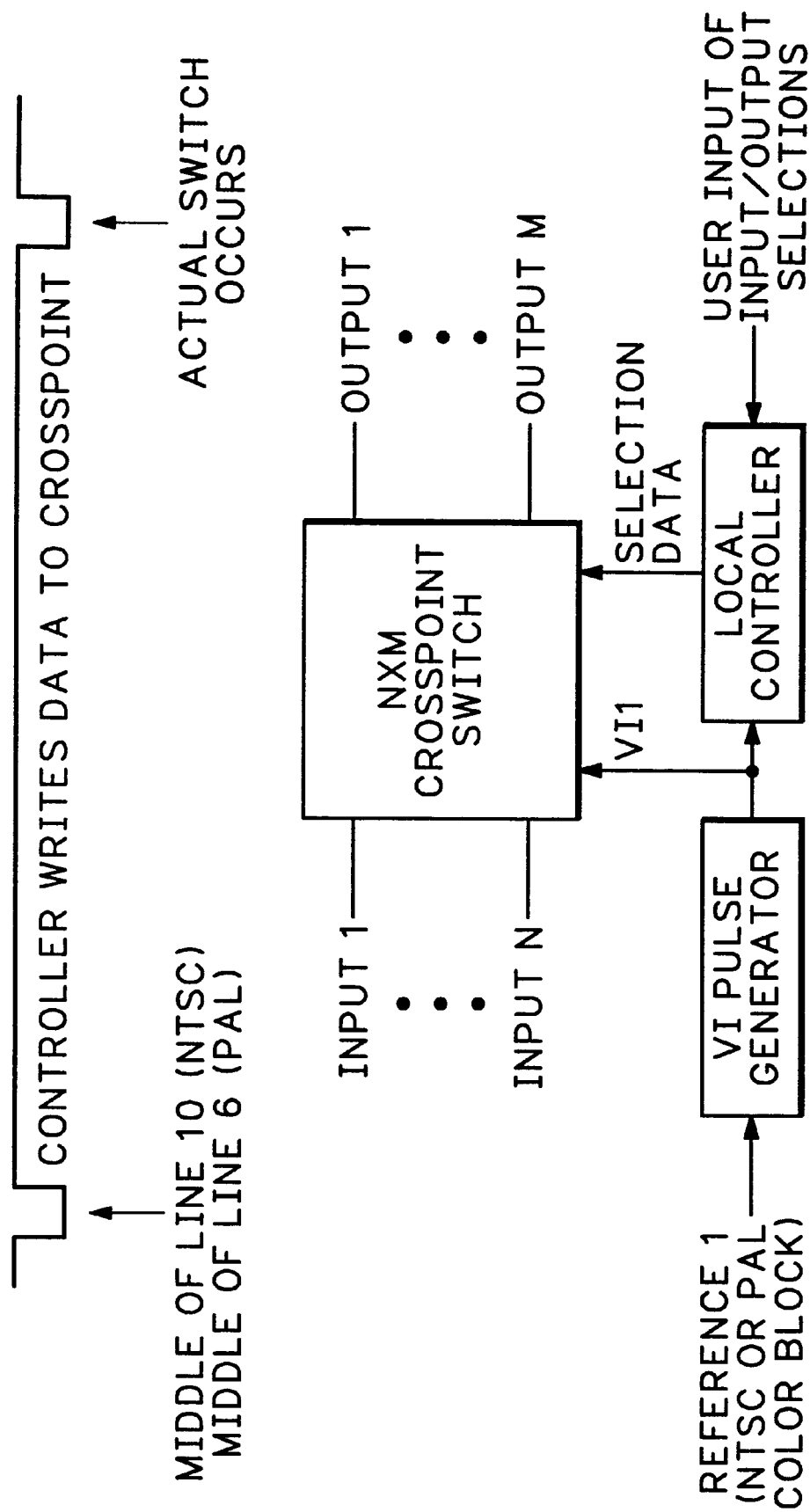
FIG. 1 is a block diagrammatic view of a prior art switching device using a single crosspoint matrix.
Figure 2:
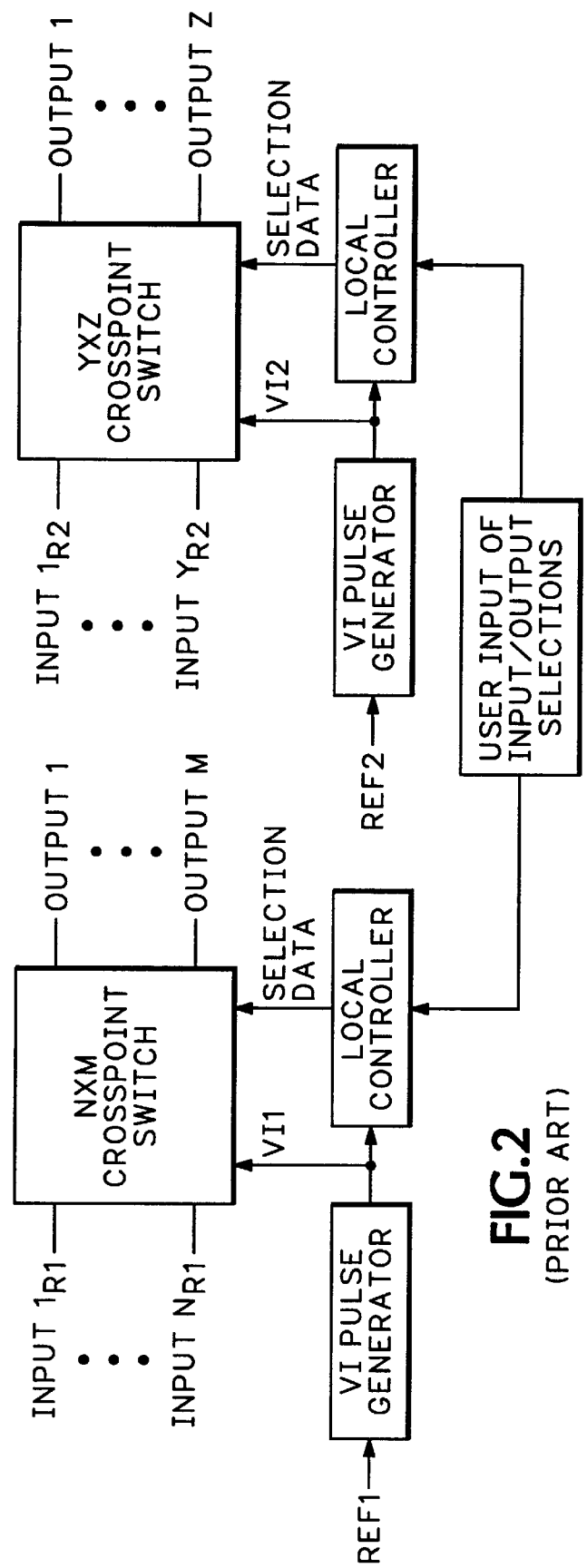
FIG. 2 is a block diagrammatic view of a prior art switching device using two crosspoint matrices.
Figure 3A:
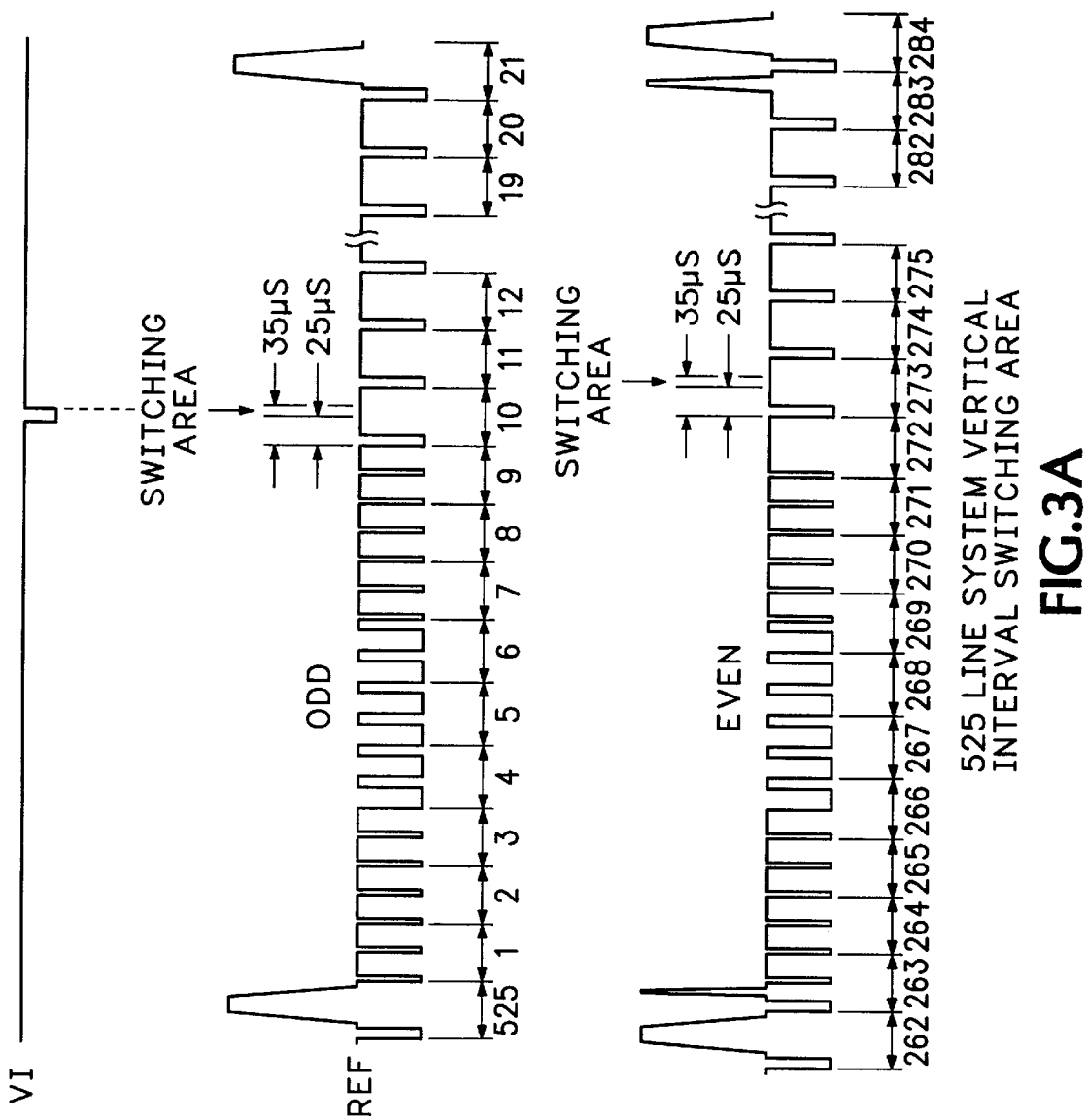
FIGS. 3A and 3B are timing diagrams showing the vertical interval switching area in 525-line and 625-line systems respectively.
Figure 3B:
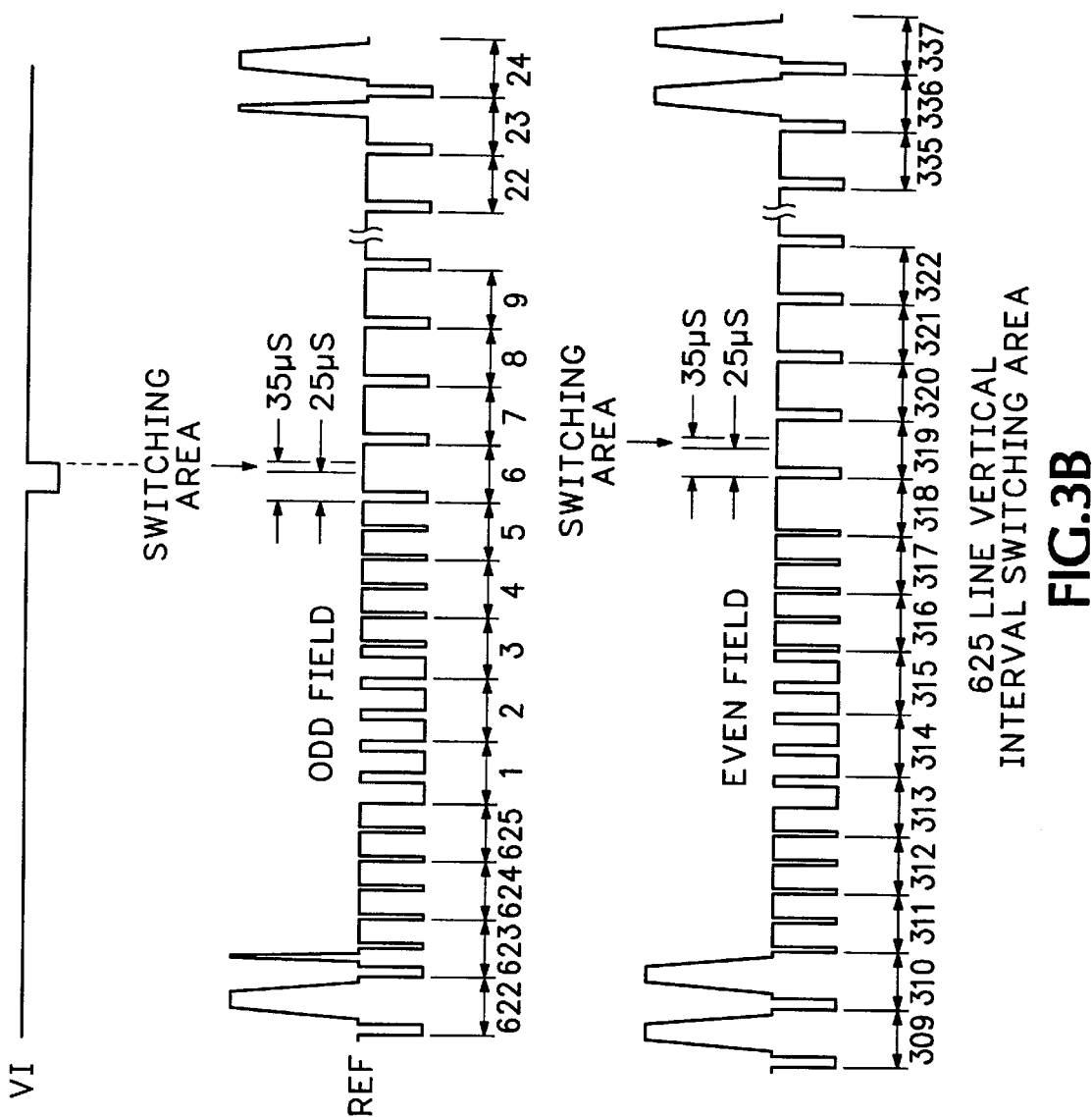
Figure 4:
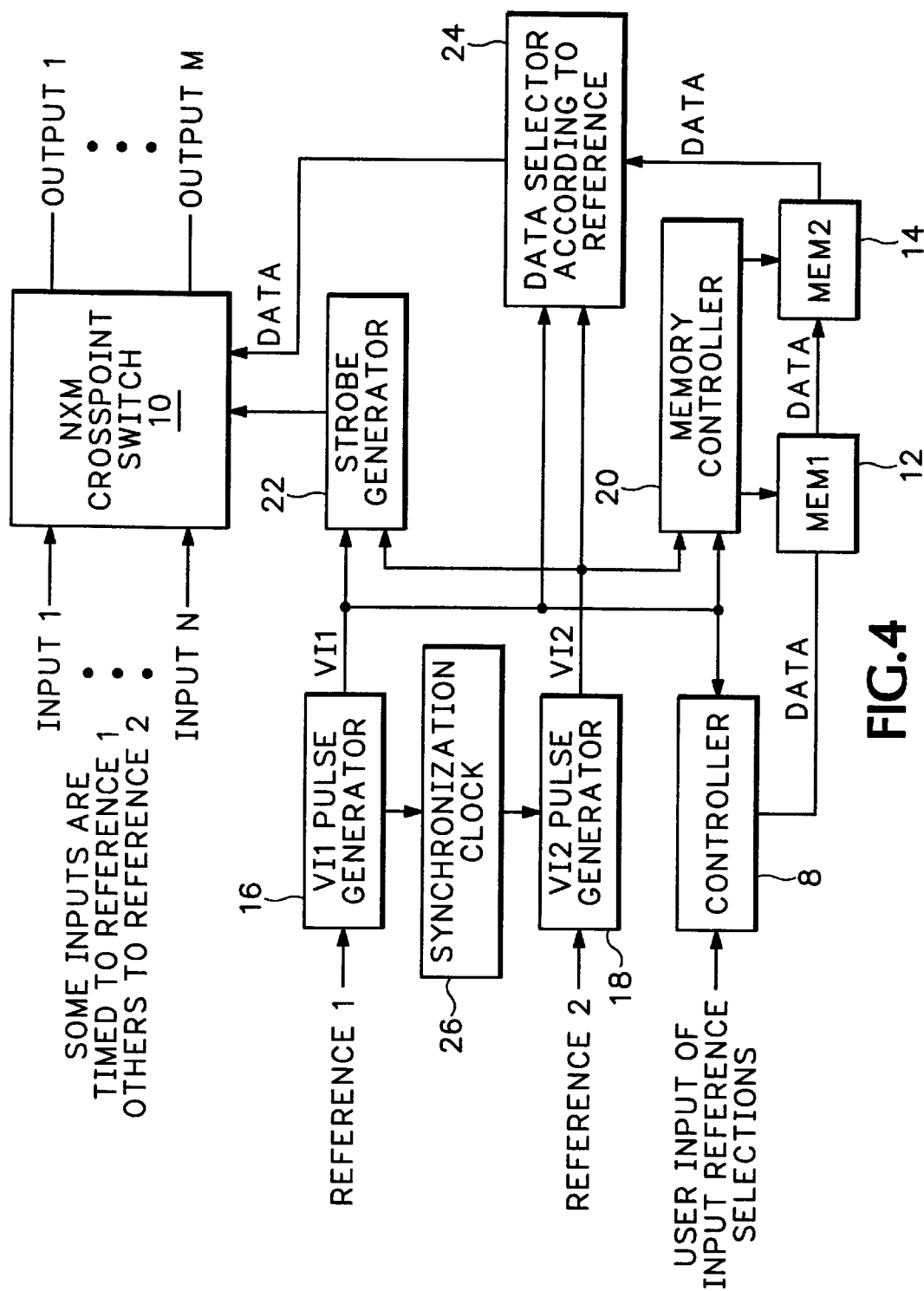
FIG. 4 is a block diagrammatic view of a device for switching video of two different standards according to the present invention.

Referring to FIG. 4, a device for switching video of two different standards is shown. A controller 8, instead of writing crosspoint selection data directly to a crosspoint matrix 10, writes the data to a first block of memory 12. The crosspoint selection data contains usual source and destination information, as well as information telling the system during which of two reference vertical intervals the switch is to occur. Two pulse generators 16,18, produce from respective reference video signals two vertical interval pulse reference signals where, referring to FIG. 3A and FIG. 3B, the pulse occurs during the middle of line 10 if the signal is generated from an NTSC reference video signal, or during the middle of line 6 if the signal is generated from a PAL reference video signal, typically color black. Hereinafter, the two vertical interval pulse reference signals are denoted as VI1 and VI2, and the reference video signals to which they respectively refer are denoted as Reference 1 and Reference 2. According to the timing diagram of FIG. 6D, at the leading edge of VI1 the crosspoint selection data contained in the first block of memory 12 is copied to a second block of memory 14 by use of a memory controller 20. The crosspoint selection data in the second block of memory 14 is then used to write crosspoint settings to the crosspoint matrix 10 for switches that are to occur according to Reference 1 by use of a crosspoint selection data selector 24. At the trailing edge of VI1 the crosspoints for Reference 1 are switched.

At the leading edge of the vertical interval pulse reference signal for Reference 2 (VI2), crosspoint selection data from the second block of memory 14 is used to write crosspoint settings to the crosspoint matrix 10 for switches that are to occur according to Reference 2 by use of the crosspoint selection data selector 24. At the trailing edge of VI2 the crosspoints for Reference 2 are switched.

Two memory blocks are needed because the controller 8 cannot write the crosspoint selection data fast enough to use only one memory block and avoid conflicts with VI1 and VI2 occurring. Much of the problem of doing the switching is that all communications is timed according to VI1. Since there is no way of knowing when VI2 occurs, it could occur while crosspoint selection data is being updated. By having the controller 8 update a dual-port ram first block of memory 12 and having crosspoints actually set from a single port second block of memory 14, conflicts in VI1 and VI2 are much less a problem. The only time the second block of memory 14 gets updated with crosspoint selection data is just after the leading edge of VI1. This transfer of crosspoint selection data from the first block of memory 12 to the second block of memory 14 can occur much faster than the controller 8 could write the crosspoint selection data. Also, the amount of time it takes to write crosspoint settings to the crosspoint matrix 10 from the second block of memory 14 is much faster than could be done by the controller 8.

Figure 7:
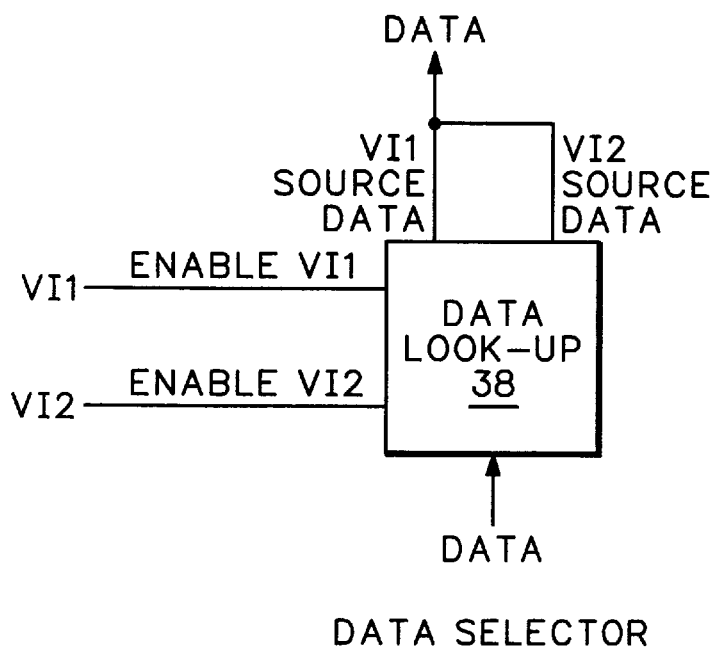
FIG. 7 is a block diagrammatic view of a data selector according to the present invention.

The data selector 24 looks at the source and reference information 38 (FIG. 7) contained in the crosspoint selection data on a destination by destination basis. Referring to FIG. 7, the enable VI1 and VI2 inputs to the data selector 24 are used to determine the status of the vertical interval pulse reference signals. If only VI1 destinations are to switch, the data selector only sends that crosspoint information to the crosspoint switch 10. If only VI2 destinations are to switch the data selector only sends that crosspoint information to the crosspoint switch 10. If there is a condition where VI1 and VI2 were occurring at the same time or overlapping, the data selector will update all crosspoints, regardless of reference. The strobe generator 22 has VI1 and VI2 as inputs and is coupled to the crosspoint switch 10. The strobe generator 22 looks at VI1 and VI2, and when a positive edge occurs it creates the strobe signal that sets all the crosspoints. When the data selector 24 writes crosspoint information to crosspoint matrix 10, the data goes into a set of registers in the crosspoint matrix 10, but the switch does not actually occur until the strobe occurs.

Figure 5:
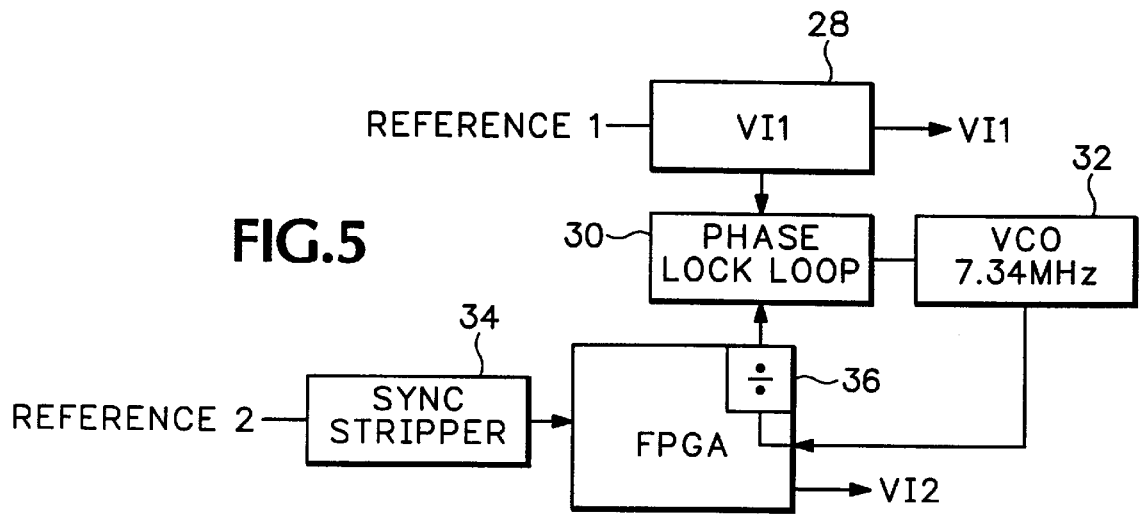
FIG. 5 is a block diagrammatic view of a synchronization clock coupled to two vertical interval reference signal pulse generators according to the present invention.

As it is possible that Reference 1 and Reference 2 may be of different frequencies, the two references may at times overlap. Also, due to the fact that VI1 and VI2 may be different frequencies, it is possible that an edge of VI2 lines up exactly with the edge of VI1, and the system would not know which edge actually occurred first. Therefore, the present invention synchronizes VI2 to VI1 by generating VI2 not only from Reference 2, but also with a synchronization clock 26 that is locked to VI1. That way it can be ensured that the edges of VI1 and VI2 never actually line up. Referring to FIG. 5, VI1 is connected to a phase lock loop 30 which drives a voltage controlled oscillator (VCO) 32 running at 7.34 MHz in the preferred embodiment, but may also be of a different frequency. VI2 is generated by first running the reference color black signal through a sync stripper 34, which strips out h(horizontal), v(vertical), and odd/even pulses. These pulses are then fed to a logic device 36 (FPGA) that uses the 7.34 MHz clock. This clock is used to sample the inputs and generate a VI2 signal. By using the correct edge of the clock it guarantees that the closest amount of time that an edge of VI2 can occur to VI1 is one half the period of the 7.34 MHz signal. This means that the logic that actually controls the switching does not have an ambiguous case where it cannot determine which edge occurred first, VI1 or VI2.

Figure 6A:
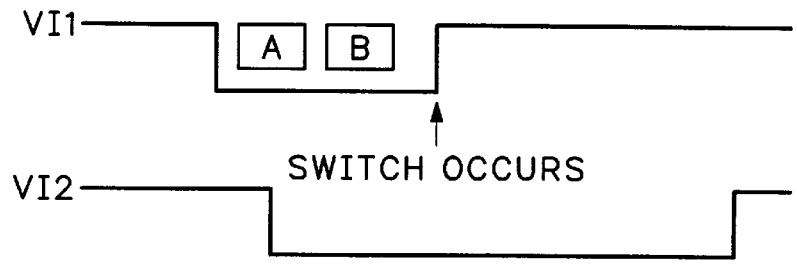

The following describes conflict conditions when VI1 and VI2 overlap in the present invention. Referring to FIG. 6A, if VI2 occurs during VI1 and the copying of crosspoint selection data from the first block of memory 12 to the second block of memory 14 is still occurring, the process finishes as described above, but the second block of memory 14 is used to update all crosspoint settings, regardless of the video reference for the crosspoint settings and the switch occurs on the rising edge of VI1.

Figure 6B:
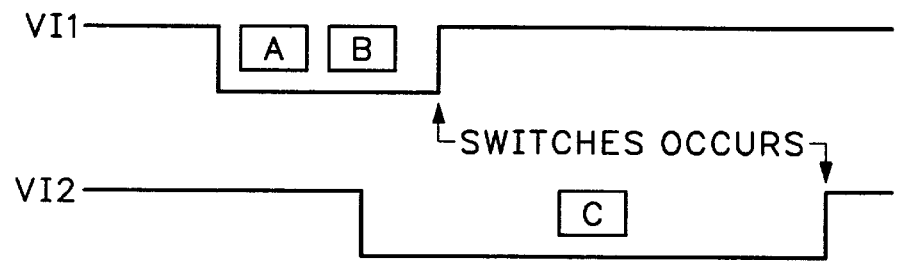

Referring to FIG. 6B, if in the above conflict the copying of crosspoint selection data from the first block of memory 12 to the second block of memory 14 is complete, then the second block of memory 14, is used to update all crosspoint settings for Reference 1. When VI1 goes high those crosspoints for Reference 1 are switched. Then the second block of memory 14 is used to update all Reference 2 crosspoints. When VI2 goes high, then those crosspoints for Reference 2 are switched. This requires that the pulse width of VI2 be at least twice the time it takes the second block of memory 14 to write all the crosspoints to the crosspoint matrix 10, so that there is enough time for the second block of memory 14 to write Reference 1 crosspoints, and then have enough time left for the second block of memory 14 to write all Reference 2 crosspoints before VI2 returns high.

Figure 6C:
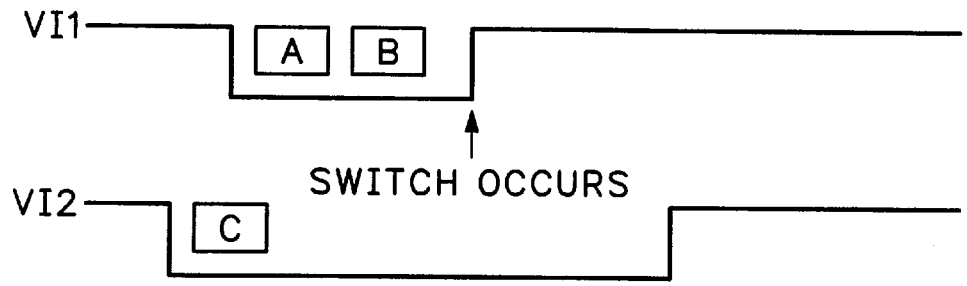

Referring to FIG. 6C, if VI1 occurs during VI2, when VI2 goes low the crosspoint selection data stored in the second block of memory 20 is used to write the crosspoint selection data for Reference 2 to the crosspoint matrix 10, but when VI1 goes low, the writing of the crosspoint selection data stored in the second block of memory 14 to the crosspoint matrix 10 is terminated. Then the crosspoint selection data contained in the first block of memory 12 is copied to the second block of memory 20, and this new crosspoint selection data in the second block of memory 14 is used to write the crosspoint selection data to the crosspoint matrix 10, regardless of Reference 1 and Reference 2. A switch will then occur on the rising edge of VI1.

Thus, the present invention provides a reliable system for switching video of two different standards in a system that allows a single controller to write crosspoint selection data at a rate according to a first reference, but allows switching to occur at the vertical interval of the first reference or a second reference of a different standard by using memory blocks to store crosspoint selection data.

What is claimed is:

1. A method for switching video of two different standards comprising the steps of:

writing crosspoint selection data from a controller to a first block of memory;

copying the crosspoint selection data contained in the first block of memory to a second block of memory at a leading edge of a first vertical interval pulse reference signal corresponding to a first video reference;

writing crosspoint settings for the first video reference to a crosspoint matrix from the crosspoint selection data contained in the second block of memory;

switching crosspoints of the crosspoint matrix for the first video reference at the trailing edge of the first vertical interval pulse reference signal;

writing crosspoint settings for a second video reference to the crosspoint matrix from the crosspoint selection data contained in the second block of memory at a leading edge of a second vertical interval pulse reference signal corresponding to the second video reference;

switching crosspoints of the crosspoint matrix for the second video reference at the trailing edge of the second vertical interval pulse reference signal.

2. The method according to claim 1 further comprising the step of:

writing crosspoint settings to the crosspoint matrix by using the crosspoint selection data in the second block of memory, regardless of the first and second video reference when and if the second vertical interval pulse reference signal occurs during the first vertical interval pulse reference signal and the copying of the crosspoint selection data from the first block of memory to the second block of memory is still occurring.

3. The method according to claim 2 wherein the second vertical interval pulse reference signal has a pulse width long enough to allow time for the second block of memory to write crosspoints to the crosspoint matrix for the first and second video references when and if the second vertical interval pulse reference signal occurs during the first vertical interval pulse reference signal and the copying of the crosspoint selection data from the first block of memory to the second block of memory is completed.

4. The method according to claim 3 further comprising the steps of:

terminating the writing of crosspoint settings when and if the first vertical interval pulse reference signal occurs during the second vertical interval pulse reference signal;

copying new crosspoint selection data from the first block of memory to the second block of memory;

writing crosspoint settings to the crosspoint matrix by using the new crosspoint selection data stored in the second block of memory regardless of the first and second video references;

switching crosspoints of the crosspoint matrix at the trailing edge of the first vertical interval pulse reference signal.

5. The method according to claim 4 further comprising the step of:

synchronizing the second vertical interval pulse reference signal with the first vertical interval pulse reference signal by using a synchronization clock that is locked to the first vertical interval pulse reference signal.

6. An apparatus for switching video of two different standards comprising:

means for writing crosspoint selection data from a controller to a first block of memory;

means for copying the crosspoint selection data contained in the first block of memory to a second block of memory at a leading edge of a first vertical interval pulse reference signal corresponding to a first video reference;

means for writing crosspoint settings for the first video reference to a crosspoint matrix from the crosspoint selection data contained in the second block of memory;

means for switching crosspoints of the crosspoint matrix for the first video reference at the trailing edge of the first vertical interval pulse reference signal;

means for writing crosspoint settings for a second video reference to the crosspoint matrix from the crosspoint selection data contained in the second block of memory at a leading edge of a second vertical interval pulse reference signal corresponding to the second video reference;

means for switching crosspoints of the crosspoint matrix for the second video reference at the trailing edge of the second vertical interval pulse reference signal.

7. The apparatus of claim 6 further comprising:

means for writing crosspoint settings to the crosspoint matrix by using the crosspoint selection data in the second block of memory, regardless of the first and second video reference when and if the second vertical interval pulse reference signal occurs during the first vertical interval pulse reference signal and the copying of the crosspoint selection data from the first block of memory to the second block of memory is still occurring.

8. The apparatus of claim 7 wherein the second vertical interval pulse reference signal has a pulse width long enough to allow time for the second block of memory to write crosspoints to the crosspoint matrix for the first and second video references when and if the second vertical interval pulse reference signal occurs during the first vertical interval pulse reference signal and the copying of the crosspoint selection data from the first block of memory to the second block of memory is completed.

9. The apparatus of claim 8 further comprising:

means for terminating the writing of crosspoint settings when and if the first vertical interval pulse reference signal occurs during the second vertical interval pulse reference signal;

means for copying new crosspoint selection data from the first block of memory to the second block of memory;

means for writing crosspoint settings to the crosspoint matrix by using the new crosspoint selection data stored in the second block of memory regardless of the first and second video references;

means for switching crosspoints of the crosspoint matrix at the trailing edge of the first vertical interval pulse reference signal.

10. The apparatus of claim 9 further comprising:

means for synchronizing the second vertical interval pulse reference signal with the first vertical interval pulse reference signal.

11. A system for switching video of two different standards comprising:

a plurality of vertical interval reference pulse generators;

a controller operative for receiving input of a video reference selection and a vertical interval pulse reference signal from one of the plurality of vertical interval reference signal pulse generators;

a first block of memory coupled to the controller for writing crosspoint selection data to the first block of memory from the controller;

a second block of memory coupled to the first block of memory;

a memory controller, operative for copying crosspoint selection data from the first block of memory to the second block of memory;

a crosspoint matrix;

a data selector coupled to the crosspoint matrix and the second block of memory, operative for writing crosspoint settings to the crosspoint matrix for switches that are to occur according to the first video reference and a second video reference.

12. The system according to claim 10 further comprising:

a synchronization clock coupled to each vertical interval reference signal pulse generator within the plurality of vertical interval reference signal pulse generators, operative for synchronizing the plurality of vertical interval reference signal pulse generators such that falling or rising edges of vertical interval pulse reference signals generated by the vertical interval reference signal pulse generators never line up.

* * * * *